United States Patent Office 3,122,706
Patented Feb. 25, 1964

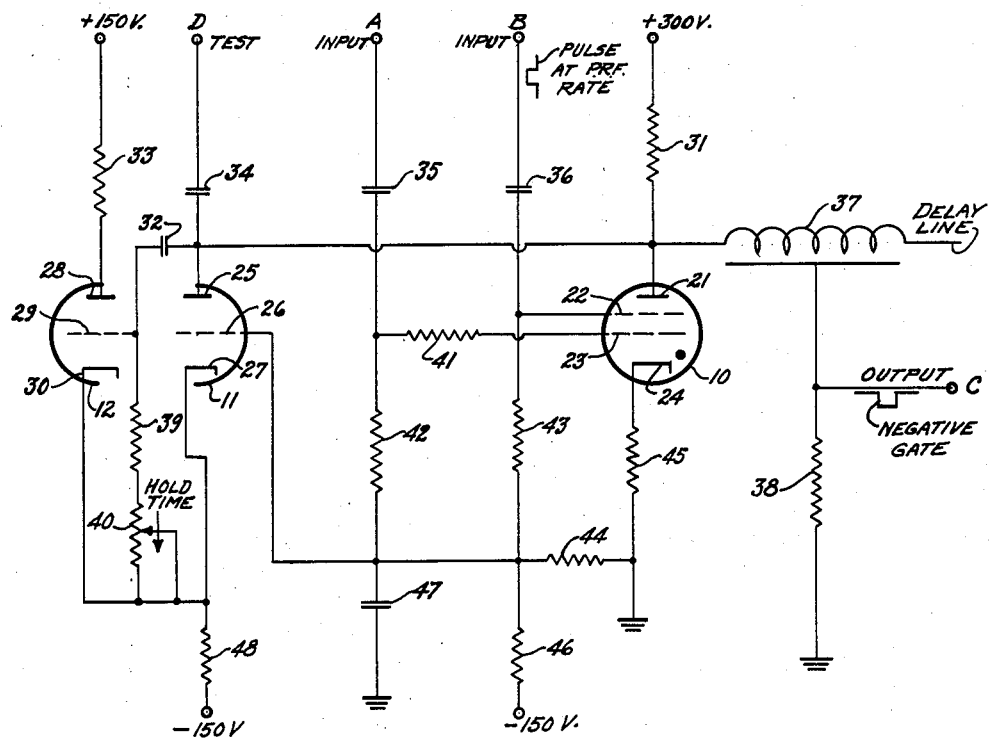
Fig. 1
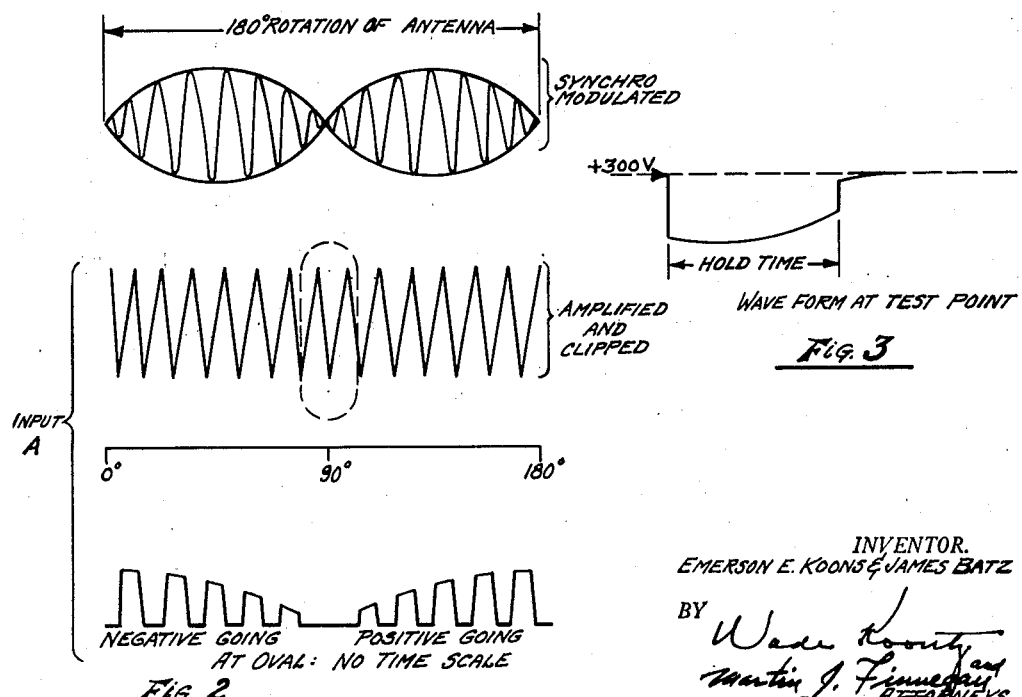
Fig. 2
Fig. 3
INVENTOR.
EMERSON E. KOONS & JAMES BATZ

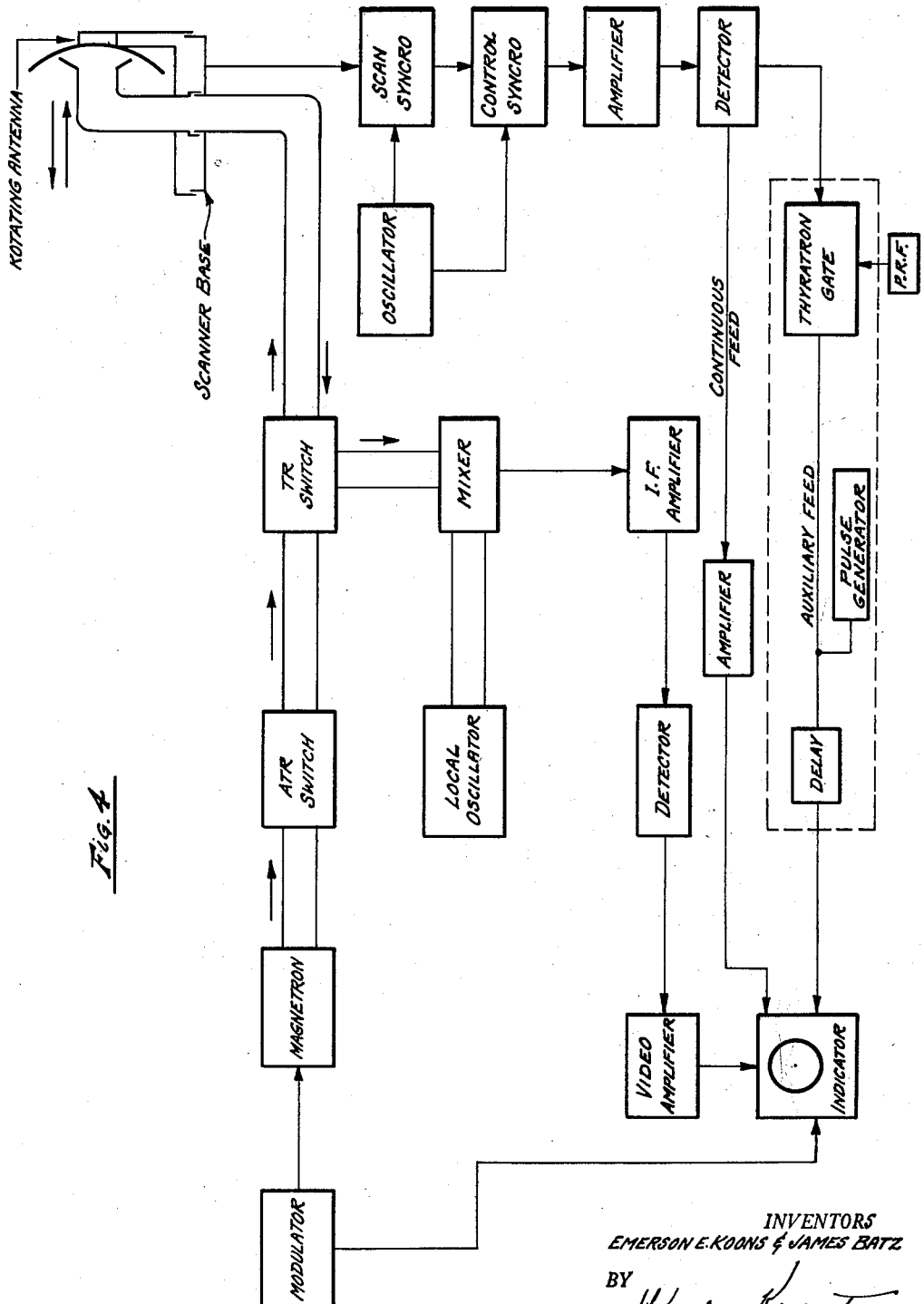

3,122,706
PULSE COINCIDENCE CONTROL OF VISUAL INDICATIONS
Emerson E. Koons, Tonawanda, and James Batz, Buffalo, N.Y.; said Koons assignor to the United States of America as represented by the Secretary of the Air Force
Filed June 5, 1956, Ser. No. 627,524
(Filed under Rule 47(a) and 35 U.S.C. 116)
4 Claims. (Cl. 328—110)

The invention relates to an electronic control circuit, and particularly to the control of the intensity of visual indications, such as plan position indications on the screen of a cathode ray tube. In the illustrated embodiment, the invention utilizes the coincidence characteristics of a thyratron tube to initiate the desired operation of a multivibrator when certain input signals coincide, thereby producing a momentary brightening of the signal on a plan position indicating scope of a pulse radar system when the scanning device is in the dead-ahead position for only one angle index line with reliable accuracy.

It is usually necessary to provide some form of quantitative indices or markers for the radar system indicator. An accepted means of generating the index or cursor on a plan position indicator, each time the scanning device is in the dead-ahead position, is by the utilization of the synchro-null method of modulating a given frequency. The advantage of this method is that the phase of the cursor or index may be controlled at a point which is remote from the scanner to which a rotating synchro is attached. However, the method has a disadvantage in that the trace at the dead-ahead scanner position is weaker than the desired strength. The circuit as described herein may be used to correct this condition, that is, (a) to brighten the trace on the plan position indicating scope to a more efficient intensity and (b) to limit the brightening operation to the very brief time period required for tracing a single index line.

The modulation introduced by the rotating synchro is sinusoidal with scanner rotation. Therefore, there are two positions, 180° apart, where the amplitude passes through a minimum as the phase of the carrier reverses. Thus, where the scanner rotation is uniform the modulation envelope obtained from the detector has a symmetrical waveform having a sharp cusp occurring at the nulls.

For any position of the control synchro there are two corresponding positions of the scanning synchro in which the output of the secondary of the control synchro goes to zero. At other positions of the scanning synchro there is an appreciable carrier signal. This signal is amplified conventionally and coupled into a conventional peak detector that is biased just beyond cut-off. The clipped signal is then utilized as one of the input signal sources of the subject invention circuit.

This amplified and clipped synchro-modulated waveform comprises one of the two inputs of the coincidence circuit and, as such, is fed to one of the control grids of a thyratron having two control electrodes. The other input consists of a square wave pulse at the pulse repetition frequency and is fed to the other control grid.

When coincidence occurs between two positive pulses of the inputs, the thyratron breaks down. The first positive pulse following the null coincidence with the synchro modulated input causes a negative output gate. The simultaneous application of positive pulses to the pair of thyratron control grids causes a triggering or firing of the thyratron.

The firing of the thyratron triggers a multivibrator circuit in such a manner as to change the potential at the thyratron plate to a more negative value which will effect a deionization thereof, so that subsequent positive pulses following the first, or keying, pulse cannot clear through the thyratron.

The above-described function of the coincidence circuit results in a brightening of the trace on the plan position indicator scope for only one index line with reliable accuracy.

It is an object of the invention to provide means to brighten the trace on a plan position indicating scope when the scanning device is in the dead-ahead position.

It is a further object of the invention to limit this brightening of the trace to one line only with reliable accuracy when the scanning device is in the dead-ahead position.

It is a still further object of the invention to provide a controllable means for holding a grid-controlled hot-cathode arc tube such as a thyratron at a low plate value for a certain desired hold time.

These and other advantages, features and objects of the invention will become more apparent from the following description taken in connection with the illustrative embodiments in the accompanying drawings wherein:

FIG. 1 shows the full circuit diagram of a preferred embodiment of the invention;

FIG. 2 illustrates the development and characteristic of the waveform applied at input A;

FIG. 3 shows the waveform at test point D for a particular utilization of the circuit;

FIG. 4 illustrates a block diagram of a simple pulse radar system showing the function of the invention in the system.

Referring to FIG. 1, which is the full circuit diagram, there is shown a grid-controlled hot-cathode arc tube such as a thyratron 10, having a cathode 24, a plate or anode 21, and two control grids 22 and 23. Interacting with said thyratron 10 is a high mu twin triode vacuum tube, separated for clarity in presentation into triodes 11 and 12. Said triodes 11 and 12 act as a multivibrator type of regenerative device which functions in either of two states and can change rapidly from one state to the other. Cathodes 27 and 30, grids 26 and 29, and anodes 25 and 28 comprise the internal components of the twin triode.

Anode 25 of the triode 11 and anode 21 of the thyratron 10 are connected to the same positive potential source through the common anode resistor 31. Anode 28 of triode 12 is connected to a source of positive potential through anode resistor 33.

Cathode 24 of the thyratron 10 is grounded through the resistor 45. Cathodes 27 and 30 of triodes 11 and 12, respectively, are connected to a common negative potential source through the resistor 48.

Grid 29 of triode 12 is connected to the cathode 27 of triode 11 through the grid biasing fixed resistor 39 and the adjustable resistor 40. Said grid 29 is also connected, through the capacitor 32, to the anode 25 of triode 11. Grid 26 of triode 11 is connected to a negative potential source through the resistor 46. Grid bias resistors 41 and 42 of grid 23 and resistor 43 of grid 22 are connected between the negative potential source and the respective control grids. Also, the coupling resistor 44 provides a path to ground for the two control grids 22 and 23 of the thyratron 10 and the grid 26 of triode 11.

Input B, having the coupling condenser 36, is fed into control grid 22 of the thyratron 10 and input A having the coupling condenser 35 feeds into control grid 23 of the said thyratron. Anodes 21 and 25 of the thyratron 10 and triode 11 are connected to a test point D through the capacitor 34.

The inductor 37 connected to said last-named anodes interacts with the circuit to form a delay line. The core of said inductor which is grounded through resistor 38 becomes the output C forming a negative gate having the waveform shown.

The circuit depicted in FIG. 1 operates in the following manner:

From a suitable source a pulse at the pulse repetition frequency is fed into input B which acts on control grid 22 of the thyratron. At the same time, a synchro-modulated signal which has been amplified and clipped is fed into input A acting on control grid 23 of the thyratron. When the positive pulse coincidence occurs both grids of the thyratron are biased. The thyratron breaks down. The first positive pulse following the null of the synchro input at A provides the coincidence signal with input B to cause firing of the thyratron to cause a negative gate at C.

When the thyratron fires, triode 12, which normally conducts, is cut off. This enables triode 11 of the multivibrator to conduct. The plate waveform of the triode 11 holds the thyratron plate at a more negative value thereby switching it off so that subsequent positive pulses following the triggering pulse cannot fire the thyratron. The hold time is determined by the resistance-capacitance time constant in the multivibrator circuit and may be controlled by adjusting resistor 40 to a desired value.

The invention has been described wtih reference to particular and well known components. However, it will be understood that other less conventional components may be substituted and adapted to those described. For example, the thyratron tube may be replaced by a so-called hard or highly evacuated electron tube and, by proper substitution of certain other components, essentially comparable results can be attained.

The description and drawings herein contained are merely illustrative and various modifications and changes will occur to those skilled in the art without departing from the invention. Therefore, we intend to be limited only by the true scope and spirit of the appended claims.

Having thus described our invention, what we claim as new and desire to secure by Letters Patent of the United States is:

1. In an electronic signal control circuit, an electronic gating device having an anode, a cathode and a pluraltiy of control elements, seprate pulse generating means connected with each of said control elements for causing said gating device to provide an output pulse only when the predetermined positive peaks of the pulses from said pulse generating means are coincident, a cathode-ray indicator connected to receive said output pulse to bias said indicator to produce a sweep of greater intensity during the period of said output pulse, and means connected with the output of said gating device and triggered thereby to disable said gating device for a predetermined period of time during which unwanted coincident positive peaks might occur.

2. In a circuit as defined in claim 1, variable resistance means associated with said means to disable said gating device for controlling the period of disablement.

3. A circuit as defined in claim 1 wherein said gating device comprises a thyratron and said means for disabling said gating device comprises a multivibrator.

4. An electronic circuit for applying a pulse of energy to a device only upon the occurrence of a predetermined pair of coincident positive pulse peaks from a pair of pulse generators comprising a thyratron gating device with control electrodes connected to receive the pulses from said pulse generators to provide a surge of current when said predetermined coincident pair of pulse peaks occur, and a multivibrator connected with the output of said thyratron to be triggered thereby and to bias said thyratron to cut off for a period after said firing of said thyratron during which unwanted coincident positive peaks may occur.

References Cited in the file of this patent

UNITED STATES PATENTS

| | | |
|---|---|---|
| 2,315,377 | Poch | Mar. 30, 1943 |
| 2,431,766 | Miller | Dec. 2, 1947 |
| 2,517,635 | Darden et al. | Aug. 8, 1950 |
| 2,679,617 | Mullaney et al. | May 25, 1954 |
| 2,693,530 | Macdonald | Nov. 2, 1954 |
| 2,773,255 | Meir et al. | Dec. 4, 1956 |
| 2,806,949 | Smith | Sept. 17, 1957 |

OTHER REFERENCES

"Electronics" (Elmore and Sands), published by McGraw-Hill (1949), pages 262 to 265 relied upon.